United States Patent [19]

Prentkowski

[11] Patent Number: 4,962,572
[45] Date of Patent: Oct. 16, 1990

[54] TONGUE ASSEMBLY

[75] Inventor: David Prentkowski, Warren, Mich.

[73] Assignee: TRW Vehicle Safety Systems Inc., Lyndhurst, Ohio

[21] Appl. No.: 483,990

[22] Filed: Feb. 22, 1990

Related U.S. Application Data

[63] Continuation of Ser. No. 313,714, Feb. 22, 1989, abandoned.

[51] Int. Cl.$^5$ ............................................. A44B 11/10
[52] U.S. Cl. ......................................... 24/323; 24/196
[58] Field of Search .................. 297/468; 24/171, 307, 24/194, 323, 196

[56] References Cited

U.S. PATENT DOCUMENTS

| | | | |
|---|---|---|---|
| 2,516,004 | 7/1950 | Kajdan | 24/196 X |
| 3,941,419 | 3/1976 | Blom . | |
| 3,974,546 | 8/1976 | Walker . | |
| 3,975,800 | 8/1976 | Farlind | 24/196 |
| 4,445,709 | 5/1984 | Bost . | |
| 4,473,926 | 10/1984 | Ono . | |
| 4,551,889 | 11/1985 | Narayan et al. . | |
| 4,588,207 | 5/1986 | Doty . | |
| 4,871,190 | 10/1989 | Willey | 297/468 X |
| 4,878,272 | 11/1989 | Kotikovsky et al. | 297/468 X |

Primary Examiner—James R. Brittain
Attorney, Agent, or Firm—Tarolli, Sundheim & Covell

[57] ABSTRACT

A tongue assembly for use in a three-point continuous loop seat belt system is freely slidable along the belt to enable use of a light retractor spring. The tongue assembly includes a lock bar slidable along a base. The base has a flat leading end portion, a parallel offset trailing end position, and a connector section extending at an angle between the leading and trailing end portions. Whe the tongue assembly is engaged with the buckle, the belt wraps around the lock bar, and the lock bar is slid along the angled connector portion of the base toward the trailing end portion. The belt is clamped between the lock bar and the trailing end portion, to restrain the vehicle occupant. When the tongue assembly is disengaged from the buckle, the belt extends through the tongue assembly in such a manner that the belt may move freely through the tongue assembly. Since the belt may move freely through the tongue assembly, the retractor wind-up spring need not be strong enough to lift both the belt and the tongue assembly, and a light retractor spring may be used.

9 Claims, 3 Drawing Sheets

TONGUE ASSEMBLY

This is a continuation of Ser. No. 313,714, filed on 2-22-89, abandoned.

BACKGROUND OF THE INVENTION

1. Field of the Invention

This invention relates to a tongue assembly for use in a safety apparatus having a belt for restraining an occupant of a vehicle against movement relative to the vehicle. More specifically, this invention relates to a free-running tongue assembly for use in a three-point continuous loop safety belt system.

2. Prior Art

Three-point continuous loop safety belt systems include a safety belt upon which a tongue assembly is slidably mounted. When the safety belt is to be connected to restrain an occupant of a vehicle, the belt is withdrawn from a retractor and the tongue assembly is connected with a buckle. When the tongue assembly is released from the buckle, the belt is wound on the retractor into a stowed position.

In a standard tongue assembly, there is a high level of friction between the tongue assembly and the belt, and the retractor spring is not strong enough to pull the belt through the tongue assembly. As the retractor rewinds the belt, both the belt and the tongue assembly are pulled upwardly by the retractor. If the tongue assembly comes up against the D-ring or retractor before retraction is completed, retraction stops because the retractor cannot pull the belt through the tongue assembly. Some belt webbing is left loose and unretracted. Since both the belt and the tongue assembly are lifted by the retractor, the retractor must have a relatively strong wind-up spring, capable of exerting enough force on the belt to lift the combined weight of the belt and tongue assembly. When the belt is in use, the relatively large force exerted by the retractor wind-up spring results in the belt being pulled across the torso of an occupant of the vehicle with a force which some occupants may find to be objectionably large.

A second type of tongue assembly is known in which there is less friction between the belt and the tongue assembly. However, enough friction remains so that the tongue does not fall freely toward the floor but rather is lifted to the D-ring or retractor. When the tongue assembly contacts the D-ring or retractor, the retractor pulls the belt through the tongue assembly, and excess webbing is stowed onto the retractor. The retractor spring must be strong enough to lift the tongue and overcome the friction between the belt and tongue.

Other systems have been designed with even less friction. U.S. Pat. No. 4,551,889 discloses a self-locking adjust tongue assembly which, when unlatched, has a lock bar depressed from the plane of the base, to permit the adjust tongue to fall freely along the belt when the belt assumes a near vertical position. U.S. Pat. No. 3,941,419 discloses a buckle component which is free to slide down the belt when the belt is in a vertical stored orientation. Co-pending U.S. patent application Ser. No. 280,148 entitled "Tongue Assembly", filed Dec. 5, 1988 by Alexander P. Kotikovsky et al., U.S. Pat. No. 4,878,272 assigned to the assignee of the present application, discloses a tongue assembly through which a belt extends with first and second straight portions having an included angle between them of at least 154°, so that the tongue assembly is able to slide on the belt under the influence of gravity. Co-pending U.S. patent application Ser. No. 256,983, filed Oct. 13, 1988 by Alexander P. Kotikovsky entitled "Tongue Assembly" and assigned to the assignee of the present application, discloses a tongue assembly in which there is a minimum amount of friction between the belt and the tongue assembly, so that the two can move easily relative to each other.

SUMMARY OF THE INVENTION

The present invention is a free-running tongue assembly for use in a safety apparatus having a belt which restrains an occupant of a vehicle against movement relative to the vehicle. The tongue assembly slides along the belt and is connectable with a buckle to secure the belt across the lap and torso of the vehicle occupant. The tongue assembly includes a lock bar which slides along a base. The base has a flat leading end portion and a connector portion which extends at an angle from the leading end portion. A trailing end portion of the base extends from the connector portion in a direction substantially parallel to but offset from the leading end portion.

When the tongue assembly is engaged with the buckle, the belt wraps around the lock bar, and the lock bar is slid along the angled connector portion of the base toward the trailing end portion. The belt is clamped between the lock bar and the trailing end portion, to restrain the vehicle occupant. When the tongue assembly is disengaged from the buckle, the belt passes through the tongue assembly with a low enough level of friction that the tongue assembly may move freely along the belt. Since the retractor wind-up spring does not have to overcome a significant amount of friction in order to pull the belt through the tongue assembly, a lighter spring may be used.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF SPECIFIC PREFERRED EMBODIMENTS OF THE INVENTION

Figure 1:
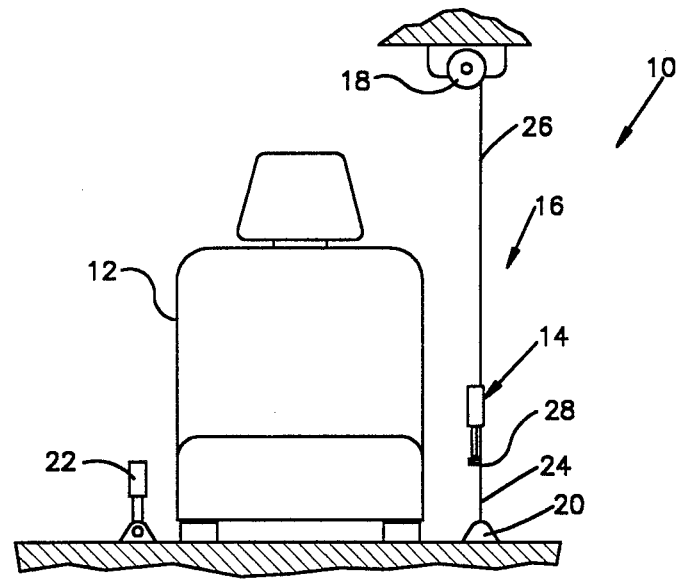
FIG. 1 is a schematic illustration of a vehicle seat and a safety apparatus for use in restraining movement of an occupant of the seat, including a tongue assembly in accordance with the present invention for engagement with a buckle.

FIG. 1 illustrates a safety apparatus 10 for use in restraining an occupant of a vehicle against movement relative to the vehicle. During operation of the vehicle, an occupant of the vehicle sits on a seat 12. The safety apparatus 10 is engaged to restrain the occupant against movement relative to the vehicle and the seat 12.

The safety apparatus 10 includes a tongue assembly 14 slidably mounted on a safety belt 16. The belt 16 is a continuous belt which extends at one end from a retractor 18 connected to the vehicle. The other end of the belt 16 is secured to a stationary mounting 20 on the vehicle.

To engage the safety apparatus 10, the tongue assembly 14 is manually grasped, and it and the belt 16 are pulled across the lap of the occupant sitting in the seat 12. As the tongue assembly 14 is pulled across the occupant's lap, the tongue assembly 14 moves along the belt 16, and more of the belt 16 is unwound from the retractor 18. The tongue assembly 14 is then connected with a buckle 22 on the side of the seat 12 opposite the stationary mounting 20. As the tongue assembly 14 is connected with the buckle 22, a portion 24 of the belt 16 is pulled tight across the lap of the occupant of the seat 12. At the same time, a portion 26 of the belt 16 extends across the occupant's torso and is tensioned by the retractor 18. A suitable stop 28 may be provided on the belt 16 to limit downward movement of the tongue assembly 14 and to hold the tongue assembly 14 in a position in which it is readily grasped by an occupant of the vehicle.

The belt portion 26, which extends between the retractor 18 and the tongue assembly 14, is tensioned by a force which must be sufficient to retract the belt 16 fully when the tongue assembly 14 is disconnected from the buckle 22. In order to minimize the force which the retractor 18 must apply to retract the belt 16, the tongue assembly 14, in accordance with the present invention, is designed so that the tongue assembly 14 can move freely along the belt 16 when not engaged with the buckle 22.

Figure 2:
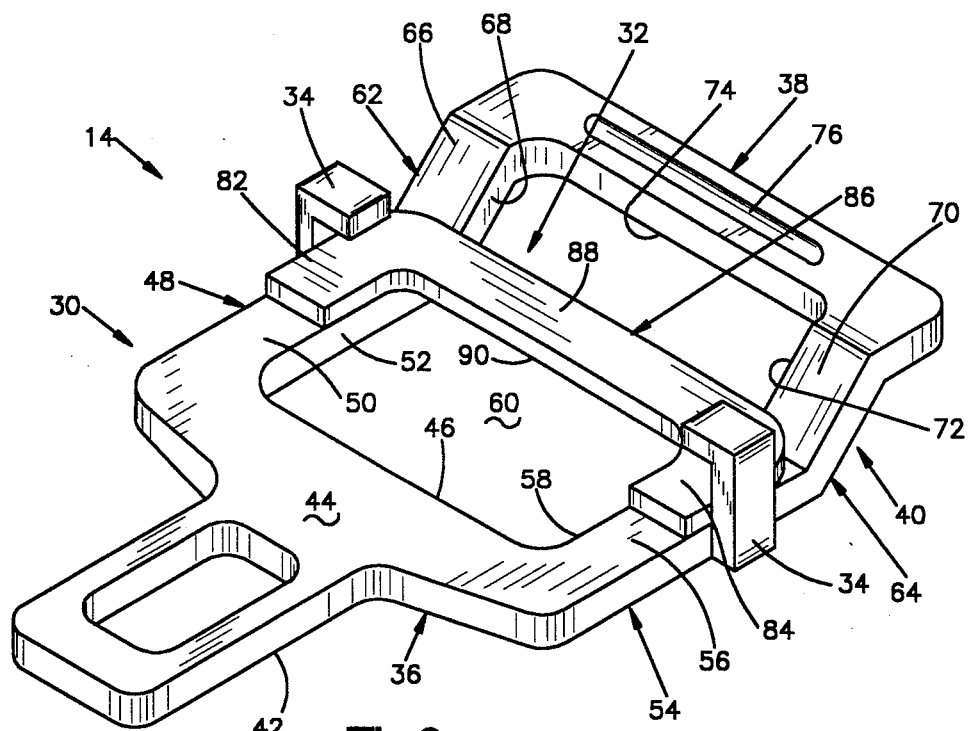
FIG. 2 is a perspective view of the base and lock bar of the tongue assembly of FIG. 1.

The tongue assembly 14 (FIG. 2) includes a base 30 and a lock bar 32 slidably disposed on the base 30. The base 30 has a pair of guide flanges 34 which keep the lock bar 32 in position relative to the base 30. The base 30 includes a flat leading end portion 36, a flat trailing end portion 38 substantially parallel to but offset from the leading end portion 36, and a connector portion 40 extending at an angle between the leading end portion 36 and the trailing end portion 40.

The leading end portion 36 of the base 30 includes a latching section 42 for engagement with the buckle 22, and a front section 44 having an edge 46. The leading end portion 36 also includes a first side section 48 having a flat major side surface 50 and an edge 52, and a second side section 54 having a flat major or side surface 56 and an edge 58. The edges 46, 52, and 58 partially define an opening 60 extending through the leading end portion 36 of the base 30.

The connector portion 40 of the base 30 includes a pair of connector side sections 62 and 64, which extend at an angle between the side sections 48 and 54 and the trailing end portion 38. The first connector side section 62 has a flat major or side surface 66 and an edge 68. The second connector side section 64 has a flat major or side surface 70 and an edge 72. The edges 68 and 72 also partially define the opening 60, which extends through the connector portion 40 as well as through the leading end portion 36 of the base 30.

The trailing end portion 38 of the base 30 extends between the connector side sections 62 and 64. The trailing end portion 38 has a clamping edge 74 which also partially defines the opening 60 in the base 30. A stiffening bead 76 extends across the trailing end portion 38.

The lock bar 32 (FIG. 2) has a first end portion 82 and a second end portion 84, which are disposed on the base 30. An intermediate portion 86 extends between the first end portion 82 and the second end portion 84 and spans the opening 60. The lock bar 32 has a planar upper major or side surface 88 and a planar lower major side surface 90.

Figure 4:
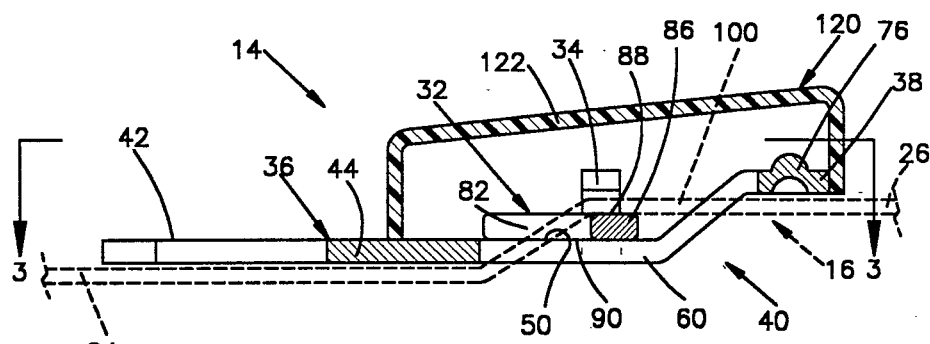
FIG. 4 is a sectional view of the tongue assembly in a condition disengaged from the buckle, taken along the line 4—4 of FIG. 3 and illustrating the belt.

FIG. 4 shows the tongue assembly 14 in a disengaged condition, that is, not engaged with the buckle 22. The lock bar 32 is disposed on and substantially parallel to the leading end portion 36 of the base 30.. The lower major side surface 90 of the lock bar 32 is disposed on the flat upper major side surfaces 50 and 56 on the base 30. The belt 16 extends through the opening 60 in the tongue assembly 14, across the intermediate portion 86 of the lock bar 32, and back out through the opening 60. The portion 26 of the belt 16 extends from one end of the tongue assembly 14, and the portion 24 of the belt 16 extends from the other end of the tongue assembly 14. A first straight portion 100 of the belt 16 extends substantially parallel to the trailing end portion 38 between the trailing end portion 38 and the planar surface 88 of the lock bar 32.

In this disengaged condition, the lock bar 32 is spaced apart from the clamping edge 74. The tongue assembly 14 can move freely along the belt 16. For example, the tongue assembly 14 can slide under the influence of gravity along the belt 16 when the belt 16 is in the position shown in FIG. 1. Accordingly, the wind-up spring in the retractor 18 need not exert enough force to lift both the belt 16 and the tongue assembly 14 into this position.

Figure 5:
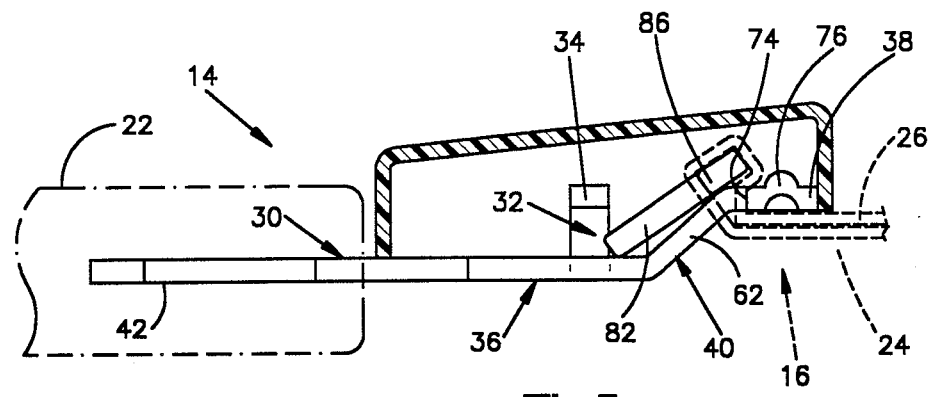
FIG. 5 is a sectional view of the tongue assembly in a condition engaged with the buckle.

FIG. 5 shows the tongue assembly 14 in an engaged condition. The latching section 42 is engaged with the buckle 22. The lock bar 32 is disposed at a angle to the leading end portion 36. The end portions 84 and 82 of the lock bar 32 have slid along the leading end portion 36 and along the connector side sections 62 and 64. The lock bar 32 is close enough to the trailing end portion 38 to clamp the belt 16 between the intermediate portion 86 of the lock bar 32 and the clamping edge 74 of the trailing end portion 38. With the lock bar 32 thus adjacent to the clamping edge 74, the belt 16 is clamped in the tongue assembly 14.

Figure 3:
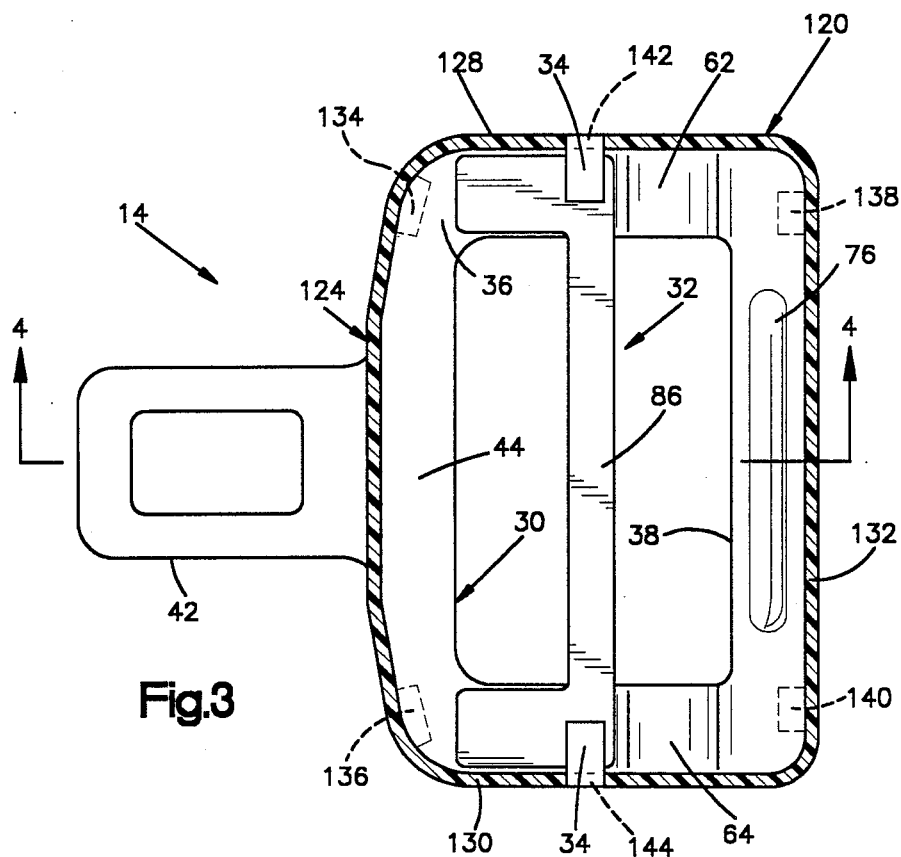
FIG. 3 is a plan view taken along the line 3—3 of FIG. 4 with the belt removed.
Figure 6:
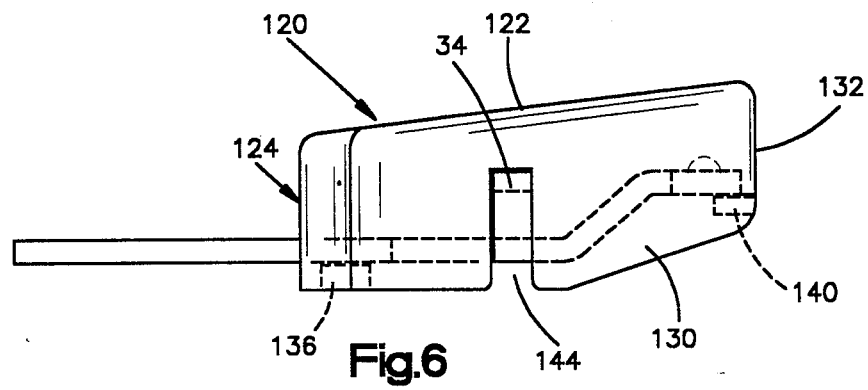
FIG. 6 a side elevational view of the tongue assembly.

A cover 120 (FIGS. 3, 4 and 6) is attached to the base 30. The cover 120 is preferably made from one piece of hard plastic and includes a top 122, a cover front portion 124, a pair of cover side portions 128 and 130, and a cover back portion 132. A first pair of retaining tabs 134 and 136 (FIG. 3) extend from the cover front portion 124. A second pair of retaining tabs 138 and 140 extend from the cover back portion 132.

The cover front portion 124 and the cover back portion 132 are generally parallel to each other. The cover front portion 124 extends generally perpendicular to the leading end portion 36 of the base 30. The cover back portion 132 extends generally perpendicular to the trailing end portion 38 of the base 30. The height of the cover front portion 124 (FIG. 4) above the leading end portion 36 of the base is substantially equal to the height of the cover back portion 132. The cover top 122 extends at an angle between the cover front portion 124 and the cover back portion 132. Thus, the cover top 122 at a location adjacent the cover front portion 124 is lower, or closer to the plane of the leading end portion 36 of the base, than is the cover top 122 at a location adjacent the cover back portion 132.

The first pair of retaining tabs 134 and 136 on the cover 120 are located under the front section 44 of the base 30, to secure the front of the cover 120 to the base 30. The second pair of retaining tabs 138 and 140 are located under the trailing end portion 38 of the base 30, to secure the back of the cover 120 to the base 30. A pair of cutouts 142 and 144 in the cover side portions 128 and 130, respectively, provide clearance for the guide flanges 34. For assembly of the cover 120 to the base 30, the cutouts 142, 144 allow sufficient flexibility of the cover back portion 132 relative to the remainder of the cover to enable the retaining tabs 138 and 140 to be positioned under the trailing end portion 38 of the base after the tabs 134 and 136 are located under the leading end portion 36 of the base.

From the above description of a preferred embodiment of the invention, those skilled in the art will perceive improvements, changes and modifications. Such improvements, changes and modifications within the skill of the art are intended to be covered by the appended claims.

Having thus described a preferred embodiment of the invention, I claim:

1. A tongue assembly for use in a safety apparatus in which a belt restrains movement of an occupant of a vehicle, said tongue assembly comprising:

a base having a leading end portion , a trailing end portion and a connector portion extending at an angle between said leading and trailing end portions, said leading end portion including a latching section for connection to a cooperating part and having the terminal end of said base, said leading end portion having a first major side surface extending form the terminal end of said base and lying in a first plane, said tailing end portion having a second major side surface lying in a second plate which is offset from and parallel to the first plane, said base having an opening which extends through said leading end portion and through said connector portion, said trailing end portion having a clamping edge spaced from said leading end portion and which is least partially defines said opening; and a lock bar slidable along said leading end portion and said connector portion of said base, said lock bar having first and second end portions and an intermediate portion extending between said first and second end portions and spanning said opening;

said lock bar having a first portion disposed at least partially on said connector portion and adjacent said clamping edge, and a second position in which said lock bar is disposed on said first major side surface on said leading end portion and spaced apart from said clamping edge.

2. A tongue assembly as defined in claim 1 wherein said opening enables the belt to pass through said tongue assembly with a first straight portion parallel to and extending between the first and second planes when said lock bar is in said second position.

3. An assembly as defined in claim 2 wherein said lock bar is disposed at an angle to the first and second planes when said lock bar is in said first position, and said lock bar is disposed upon said leading end portion and parallel to the first and second planes when said lock bar is in said second position.

4. An assembly as defined in claim 3 wherein the belt is clamped between said clamping edge on said base and said intermediate portion of said bar when said lock bar is in said first position.

5. An assembly as defined in claim 4 further comprising a pair of guide flanges extending from said leading end portion of said base on opposite sides of said opening, said guide flanges guiding said end portions of said lock bar as said lock bar slides along said leading end portion and said connector portion of said base.

6. An assembly as defined in claim 2 wherein the safety apparatus includes a buckle, and said leading end portion of said base includes a latching section for connection with the buckle when said lock bar is in said first position.

7. An assembly as defined in claim 6 wherein said lock bar is generally U-shaped, said first and second end portions of said lock bar forming the legs of the U-shaped bar and extending from said intermediate portion of said lock bar in a direction generally toward said latching section of said base.

8. A tongue assembly as defined in claim 1 and further comprising a cover attached to said base, said cover including a front portion, a top, a pair of side portions and a back portion, said cover front portion being secured to said leading end portion of said base, said cover back portion being secured to said trailing end portion of said base, said cover front and back portions extending generally parallel to each other and extending generally perpendicular to said leading and trailing end portions of said base respectively, the height of said cover front portion above said leading end portion of said base being substantially equal to the height of said cover back portion, said cover top extending between said cover front and back portions at an angle to said cover front and back portions whereby the cover top adjacent said cover front portion is located closer to the plane of said leading end portion of said base than the cover top adjacent said cover back portion.

9. A tongue assembly for use in a safety apparatus in which a belt restrains movement of an occupant of a vehicle, said tongue assembly comprising:

a base having a leading end portion, a trailing end portion and a connector portion extending at an angle between said leading and trailing end portions, said leading end portion including a latching section for connection to a cooperating part and having the terminal end of said base, said leading end portion having a first major side surface extending from the terminal end of said base and lying in a first plane, said trailing end portion having a second major side surface lying in a second plane which is offset from and parallel to the first plane, said base having an opening which extends through said leading end portion and through said connector portion, said trailing end portion having a clamping edge spaced from said leading end portion and which at least partially defines said opening; and a lock bar slidable along said leading end portion and said connector portion of said base, said lock bar having first and second end portions and an intermediate portion extending between said first and second end portion s and spanning said opening;

said lock bar having a first position disposed at least partially on said connector portion and adjacent said clamping edge and a second position in which said lock bar is disposed on said leading end portion and spaced apart from said clamping edge, said lock bar being disposed at an angle to the first and second planes when said lock bar is in said first position, and said lock bar being disposed upon said first major side surface on said leading end portion and parallel to the first and second planes when said lock bar is in said second position;
said opening enabling the belt to pass through said tongue assembly with a first and second planes when said lock bar is in said second position;
said bar clamping the belt between said clamping edge on said base and said intermediate portion of said bar when said lock bar is in said first position.

* * * * *

UNITED STATES PATENT AND TRADEMARK OFFICE
CERTIFICATE OF CORRECTION

PATENT NO. : 4,962,572

DATED : October 16, 1990

INVENTOR(S) : David Prentkowski

It is certified that error appears in the above-identified patent and that said Letters Patent is hereby corrected as shown below:

Column 5, Line 36, Claim 1, change "tailing" to --trailing--.

Column 8, Line 1, Claim 9, insert --straight portion parallel to and extending between the first-- after "first" and before "and".

Signed and Sealed this

Tenth Day of March, 1992

Attest:

HARRY F. MANBECK, JR.

*Attesting Officer*   *Commissioner of Patents and Trademarks*